United States Patent [19]
Masino et al.

[11] 3,858,519
[45] Jan. 7, 1975

[54] TRANSFER CONVEYOR ASSEMBLY

[75] Inventors: Leo Masino, Karlsruhe-Durlach; Horst Guth, Grotzingen, both of Germany

[73] Assignee: E. Th. Noack Verpackungsmaschinen, Grotzingen, Germany

[22] Filed: Oct. 26, 1973

[21] Appl. No.: 409,886

[30] Foreign Application Priority Data
Nov. 2, 1972 Germany............................ 2253632

[52] U.S. Cl.................. 104/88, 104/172 R, 198/34, 198/37
[51] Int. Cl............................................ F04d 13/12
[58] Field of Search .......... 198/34, 37, 102; 104/88, 104/172 R

[56] References Cited
UNITED STATES PATENTS
2,916,792  12/1959  Crook et al...................... 198/37 X Primary Examiner—Evon C. Blunk
Assistant Examiner—Douglas D. Watts
Attorney, Agent, or Firm—Spencer & Kaye

[57] ABSTRACT

Between two successive article handling machines there is positioned an article transfer conveyor assembly which includes, in succession, a receiving portion, a transfer portion and a discharge portion. Receptacles, guided by a track, travel through the three portions. The receiving and the discharge portions have conveyor devices to effect a forced synchronized transport of the receptacles, while the transfer portion includes a conveyor mechanism which permits an accummulation of the receptacles thereon. The operations of the conveyor devices of the receiving and discharge portions are controlled by the respective article handling machine which adjoins the receiving or the discharge portion.

7 Claims, 2 Drawing Figures

TRANSFER CONVEYOR ASSEMBLY

BACKGROUND OF THE INVENTION

The manufacture of certain articles, such as adhesive dressings, involves the problem that the articles have to be first packaged and then boxed, that is, placed into containers in which they are shipped and stored. For the packaging and boxing, normally two separate article handling machines are used which operate with completely different systems and run with different speeds. Often, one of these machines is working intermittently, whereas the other operates in a continuous manner.

The problem to be solved by the invention resides in matching the modes of operation of the two article handling machines in such a manner that a disturbance-free, smooth transition of the packaged goods from the first article handling (packaging) machine into the second article handling (boxing) machine is ensured.

It has already been proposed to use a disc with bowl-shaped containers which slide on a circular path and which are axially secured, but are alterable in their angular position with respect to one another. This angular adjustment serves for the equalization of the different work speeds with which the two article handling machines operate. The proposed arrangement, however, has the disadvantage that the bowl-shaped containers can serve only as intermediate stations and that there is required still another reloading in the zone of the second article handling (boxing) machine.

SUMMARY OF THE INVENTION

It is an object of the invention to provide an improved transfer conveyor assembly with which the above-noted disadvantages are eliminated.

This and other objects to become apparent as the specification progresses are accomplished by the invention according to which, briefly stated, there is provided a transfer conveyor assembly which serves as a connecting component between, for example, a packaging machine and a boxing machine and includes a receiving portion, a transfer portion and a discharge portion. The packaged goods to be boxed are carried in receptacles which, in turn, are transported from the receiving portion through the transfer portion to the discharge portion and which, on their transport device, are shiftable in the transfer portion in the direction of transport with respect to one another. The motion of the receptacles is controlled in a forced manner only in the receiving portion and the discharge portion of the conveyor assembly.

The above-outlined arrangement has the significant advantage that it can be universally used and adapted to all modes of operation. This applies above all in cases where the mode of operation of one of the machines is intermittent, whereas that of the other is continuous.

A further advantage of the invention resides in the fact that the receptacles filled in the first article handling (packaging) machine may be introduced into the second article handling (boxing) machine to such an extent that the handling (boxing operation) of the articles in the second article handling machine may be effected directly from the receptacles without the need of an additional reloading.

DESCRIPTION OF THE PREFERRED EMBODIMENTS

Figure 1:
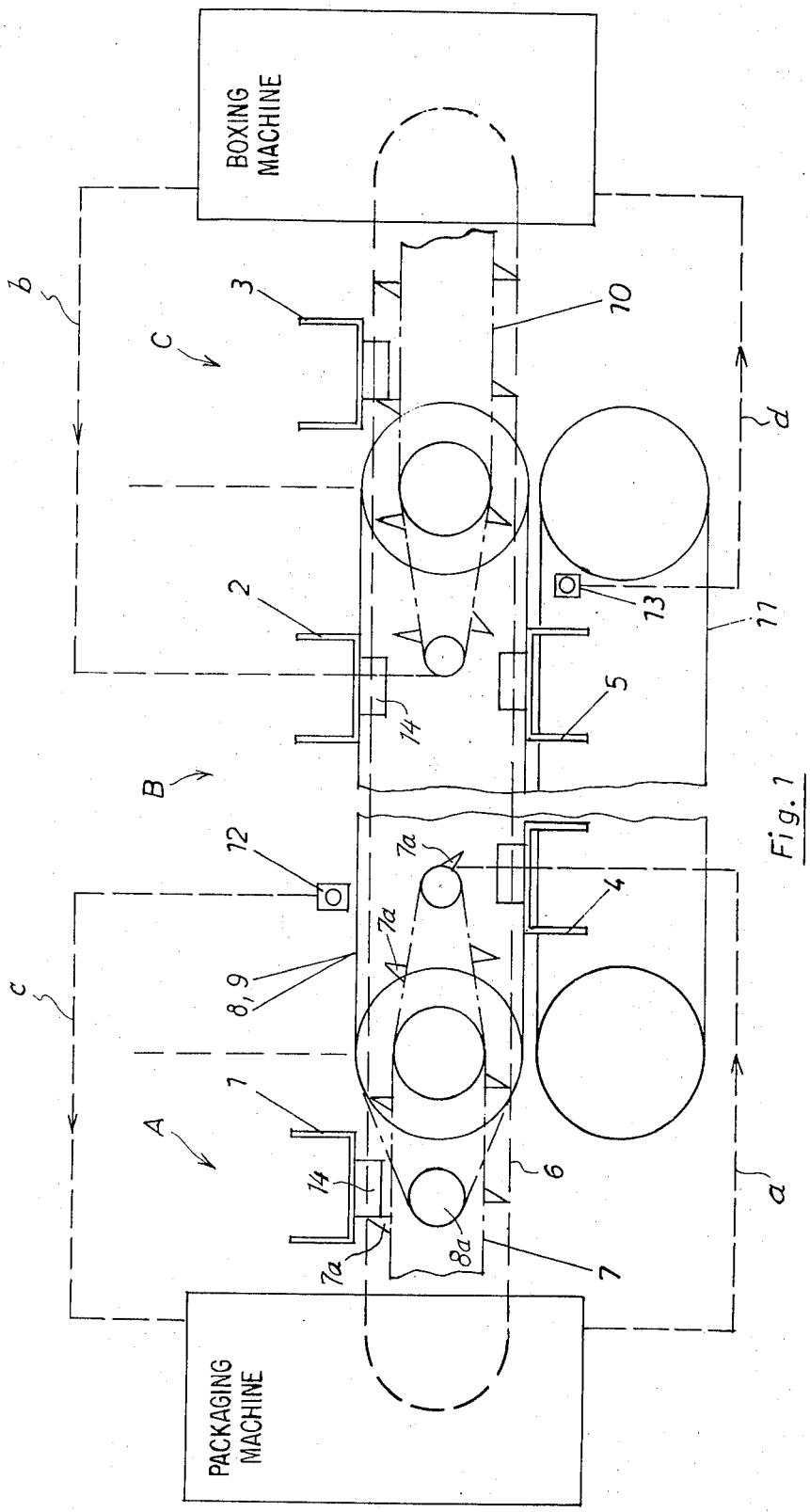
FIG. 1 is a schematic side elevational view of a preferred embodiment of the invention.
Figure 2:
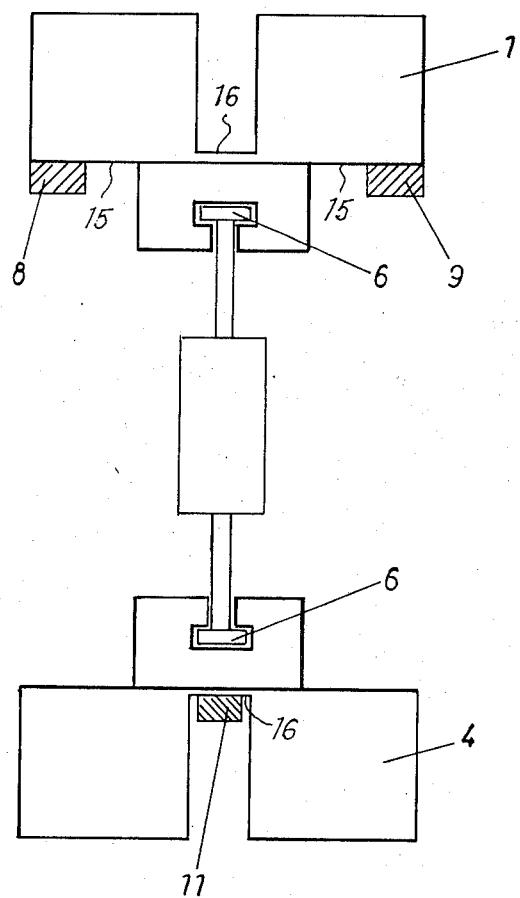
FIG. 2 is a schematic sectional front elevational view of the same embodiment.

Turning now to the figures, the transfer conveyor assembly comprises in essence a receiving part A, a transfer part B, and a discharge part C. The transport receptacles 1, 2, 3, 4 and 5, which serve for receiving from a packaging machine the packaged articles to be subsequently boxed, are guided in an endless T-rail 6. In the receiving part A, the motion of the receptacles is synchronized by means of a first carrier chain 7. This is effected by carrier members 7a spacedly attached to and travelling with the carrier chain 7. Each carrier member 7a is adapted to engage a lug 14 affixed to each receptacle for moving the latter along the rail track 6 in a forced manner. The carrier chain 7 is driven and controlled by the packaging machine in such a manner that its motion is intermittent. For example, while a counted number of receptacles available in the zone of the packaging machine is loaded, the carrier chain 7 is stopped. The driving connection between the packaging machine and the carrier chain 7 is symbolized by the broken line a in FIG. 1. Downstream of the carrier chain 7, when viewed in the direction of advance of the loaded receptacles, there is disposed the transfer portion B which comprises two horizontally spaced, parallel endless belts 8 and 9 continuously driven by motor 8a. The upper reaches of belts 8, 9 form a conveyor-and-slippage band onto which the receptacles are pushed by the first carrier chain 7. As seen in FIG. 2, opposite marginal zones of the underside 15 frictionally engage, by means of gravity, the upper face of the conveyor-and-slippage band 8, 9. Normally, the receptacles are conveyed by the band 8, 9 in a uniformly spaced manner, but when crowding occurs, the receptacles "pile up" one behind the other, in which case the thus accumulated receptacles are stationary, while the band 8, 9 slides under them. It is thus seen that the band 8, 9 transports the receptacles in a non-forced manner.

From the transfer portion B, the loaded receptacles are forwarded by means of a second carrier chain 10 (which may be identical in structure to the first carrier chain 7) of the discharge portion C. The speed of the chain 10 and thus the speed of the receptacles is directly or indirectly controlled by the boxing machine; preferably this speed is adjustable between wide limits to the operational speed of the boxing machine. The driving connection between the second carrier chain 10 and the boxing machine is symbolized by the broken line b in FIG. 1. The receptacles are introduced into the boxing machine to such an extent that the boxing of the goods may be effected directly from the receptacles without the need of an additional reloading.

The emptied receptacles 4, 5 are pushed by the returning stretch of the endless chain 10 and are, in an inverted position, advanced onto the transfer portion B to be carried by a conveyor-and-slippage band 11, disposed centrally below the endless belts 8, 9. As seen in FIG. 2, the receptacles engage the band 11 with a face 16 which is oriented in a direction away from the underside 15 and which extends along the center of each receptacle. The band 11, similarly to the band 8, 9, transports the receptacles, but permits accumulation thereon by virtue of slippage. Thus band 11 (which has a drive means not shown) also transports the receptacles in a non-forced manner.

The closed-circuit motion of the receptacles is completed when the emptied receptacles, upon transfer onto the receiving portion A, are received by the lower, or returning reach of the carrier chain 7 and are thus moved in an intermittent manner.

In the described preferred embodiment, in each portion of the transfer conveyor assembly (that is, in receiving portion A, transfer portion B and discharge portion C) the conveyors have a forwardly moving portion (carrying loaded receptacles in a direction from the packaging machine to the boxing machine) and a rearwardly moving portion (carrying empty receptacles in a direction from the boxing machine to the packaging machine).

The operational speed of the boxing machine is selected to be somewhat lower than that of the packaging machine to ensure that a sufficient number of loaded receptacles are available at all times. If a major accumulation occurs on the conveyor and slippage band 8, 9, a preferably photocell-controlled device 12 temporarily stops the packaging machine. The connection between the device 12 and the packaging machine is symbolized by the broken line c. If, on the other hand, during the return of the emptied receptacles, a major accumulation occurs on the band 11, then a preferably photocell-controlled device 13 temporarily stops the boxing machine. The connection between the device 13 and the boxing machine is symbolized by the broken line d.

It is thus seen that the above-described transfer conveyor assembly serves to match two synchronized motions, that is, an intermittent motion, and a continuous motion which is adjustable in its speed.

It will be understood that the above description of the present invention is susceptible to various modifications, changes, and adaptations, and the same are intended to be comprehended within the meaning and range of equivalents of the appended claims.

We claim:

1. A transfer conveyor assembly for carrying articles from a first article handling machine to a second article handling machine, comprising in combination:
   a. a plurality of individual receptacles for receiving said articles;
   b. a guide means extending between said article handling machines for guiding each said receptacle in its travel from one article handling machine to the other;
   c. a receiving portion disposed along the path of said guide means, said receiving portion including a first conveyor means extending from said first article handling machine and having means for a forced, synchronized transport of said receptacles;
   d. a transfer portion disposed along the path of said guide means, said transfer portion including a second conveyor means extending from said first conveyor means and having means for a non-forced transport of said receptacles to provide for a possible accumulation of receptacles on said second conveyor means;
   e. a discharge portion disposed along the path of said guide means, said discharge portion including a third conveyor means extending from said second conveyor means to said second article handling machine and having means for a forced, synchronized transport of said receptacles;
   f. means for controlling the motion of said first conveyor means as a function of the operation of said first article handling machine;
   g. means for controlling the motion of said third conveyor means as a function of the operation of said second article handling machine; and
   h. means for driving said second conveyor means.

2. A transfer conveyor assembly as defined in claim 1, wherein said second conveyor means is formed of conveyor-and-slippage band means transporting said receptacles by virtue of gravity-caused frictional engagement between band and receptacle.

3. A transfer conveyor assembly as defined in claim 1, wherein said guide means is arranged in a closed circuit for guiding each receptacle in an endless travelling path between the two article handling machines, each conveyor means has a forwardly moving part for transporting receptacles from the first article handling machine toward the second article handling machine and a backwardly moving part for transporting receptacles from the second article handling machine toward the first article handling machine.

4. A transfer conveyor assembly as defined in claim 3, wherein said first and third conveyor means each comprises an endless conveyor chain.

5. A transfer conveyor assembly as defined in claim 3, wherein each said receptacle has an underside; said second conveyor means includes a first conveyor-and-slippage band means formed of two horizontally spaced, parallel endless belts for transporting said receptacles from the first conveyor means to the third conveyor means by virtue of a gravity-caused frictional engagement between each belt and spaced marginal faces of said underside, said second conveyor means further includes a second conveyor-and-slippage band means formed of a further endless belt disposed parallel and adjacent to said first conveyor-and-slippage band means for transporting said receptacles from the third conveyor means to the first conveyor means by virtue of a gravity-caused frictional engagement between said further belt and a central face portion of each receptacle, said central face portion is oriented in a direction opposite to said underside.

6. A transfer conveyor assembly as defined in claim 1, including sensor means connected to said first article handling machine and responsive to a determined extent of receptacle accumulation on said second conveyor means for stopping said first article handling machine upon reaching said receptacle accumulation.

7. A transfer conveyor assembly as defined in claim 3, including sensor means connected to said second article handling machine and responsive to a determined extent of receptacle accumulation on the backwardly moving part of said second conveyor means for stopping said second article handling machine upon reaching said receptacle accumulation.

* * * * *